(12) United States Patent
Raisch et al.

(10) Patent No.: US 10,539,207 B2
(45) Date of Patent: Jan. 21, 2020

(54) TRANSMISSION ARRANGEMENT

(71) Applicant: DEERE & COMPANY, Moline, IL (US)

(72) Inventors: Stefan Raisch, Vaihingen/Enz (DE); David Mueller, Stutensee (DE)

(73) Assignee: DEERE & COMPANY, Moline, IL (US)

( * ) Notice: Subject to any disclaimer, the term of this patent is extended or adjusted under 35 U.S.C. 154(b) by 806 days.

(21) Appl. No.: 15/143,765

(22) Filed: May 2, 2016

(65) Prior Publication Data

US 2016/0327126 A1 Nov. 10, 2016

(30) Foreign Application Priority Data

May 4, 2015 (DE) .................. 10 2015 208 164

(51) Int. Cl.
*F16H 3/085* (2006.01)
*F16H 3/097* (2006.01)

(52) U.S. Cl.
CPC ............. *F16H 3/085* (2013.01); *F16H 3/097* (2013.01)

(58) Field of Classification Search
CPC .......... F16H 3/006; F16H 3/085; F16H 3/097; F16H 37/043; F16H 2003/0826; F16H 2037/045
See application file for complete search history.

(56) References Cited

U.S. PATENT DOCUMENTS

| | | | | |
|---|---|---|---|---|
| 3,802,293 A | * | 4/1974 | Winckler | ............... F16H 3/097 74/331 |
| 2005/0204841 A1 | * | 9/2005 | Baldwin | ............... F16H 3/006 74/331 |
| 2007/0266812 A1 | | 11/2007 | Asada | |
| 2014/0202272 A1 | * | 7/2014 | Hedman | ............... F16H 3/097 74/331 |

FOREIGN PATENT DOCUMENTS

| | | | |
|---|---|---|---|
| DE | 2156714 A1 | | 5/1973 |
| DE | 102005030987 A1 | | 1/2007 |
| DE | 10 2005 045 005 | * | 3/2007 |
| DE | 102010029597 A1 | | 12/2011 |
| DE | 102012208126 A1 | | 11/2013 |
| DE | 10 2014 204 437 | * | 3/2014 |
| EP | 0 110 538 | * | 6/1984 |
| EP | 0797025 A1 | | 9/1997 |
| EP | 1624232 A1 | | 2/2006 |

(Continued)

OTHER PUBLICATIONS

European Search Report in application 16168082.2, dated Sep. 19, 2016 (11 pages).

(Continued)

*Primary Examiner* — William C Joyce

(57) ABSTRACT

A transmission arrangement, particularly for an agricultural working vehicle, has a parallel-shift transmission and an input shaft, proceeding from which input shaft a drive power can be distributed via a first and a second shifting element to respective layshafts, and has a first and a second coaxially arranged output shaft, wherein the drive power can be transmitted by each of the layshafts to each of the output shafts as needed, and has a group-shift transmission with multiple shifting groups.

9 Claims, 9 Drawing Sheets

(56) References Cited

FOREIGN PATENT DOCUMENTS

EP       2243983 A2    10/2010
JP    2008180255 A     8/2008

OTHER PUBLICATIONS

European Search Report in application 16168086.3 dated Sep. 19, 2016 (10 pages).
German Search Report in foreign counterpart application No. 102015208164.8 dated Jun. 23, 2016 (7 pages).
German Search Report in foreign counterpart application No. 102015208166.4 dated Jun. 24, 2016 (7 pages).

* cited by examiner

|    | 1 | 3 | 2 | 4 | 5 | 7 | 6 | 8 | A | B | 88₁ C | 88₁ W |
|----|---|---|---|---|---|---|---|---|---|---|---|---|
|    |   |   |   |   |   |   |   |   |   |   |   |   |
| A1 | ✗ |   |   |   |   |   |   |   |   |   |   | ✗ |
| A2 |   |   | ✗ |   |   |   |   |   | ✗ |   |   | ✗ |
|    |   |   |   |   |   |   |   |   | ✗ |   |   |   |
|    |   |   |   |   |   |   |   |   |   |   |   |   |
| B1 | ✗ |   |   |   |   |   |   |   |   | ✗ |   |   |
| B2 |   |   | ✗ |   |   |   |   |   |   | ✗ |   | ✗ |
|    |   |   |   |   |   |   |   |   |   |   |   |   |
|    |   |   |   |   |   |   |   |   |   |   |   |   |
| B7 |   |   |   |   |   | ✗ |   |   |   | ✗ |   | (✗) |
| B8 |   |   |   |   |   |   |   | ✗ |   | ✗ |   | (✗) |
| C1 | ✗ |   |   |   |   |   |   |   |   |   | ✗ |   |
| C2 |   | ✗ | ✗ |   |   |   |   |   |   |   | ✗ |   |

FIG. 4

TRANSMISSION ARRANGEMENT

CROSS-REFERENCE TO RELATED APPLICATIONS

Pursuant to 35 USC § 119, this application claims the benefit of and priority to German patent application no. 102015208164.8, filed on May 4, 2015, which is herein incorporated by reference in its entirety.

FIELD OF THE DISCLOSURE

The disclosure relates to a transmission arrangement, particularly for an agricultural working vehicle, having a parallel-shift transmission and an input shaft, proceeding from which input shaft a drive power can be distributed via a first and a second shifting element to respective layshafts, and having a first and a second coaxially arranged output shaft, wherein the drive power can be transmitted by each of the layshafts to each of the output shafts as needed, and having a group-shift transmission with multiple shifting groups.

BACKGROUND

In agricultural working vehicles such as tractors, the transmission arrangements must cover very different driving ranges due to the very wide range of use of the vehicle. This requires a correspondingly large spread between the slowest and the fastest transmission ratio stages of the transmission arrangements. "Slow" and "fast" in this context refer to the resulting travel speed of the vehicle. Transmission arrangements for agricultural working machines generally also have small geometric stage intervals between individual transmission stages, so that in combination with the large spreading, a large number of gears is the result. In transmission arrangements for agricultural working machines, this large number of gear stages can be implemented with a reasonable effort by a group design.

One possible structure for a transmission arrangement for an agricultural working vehicle consists of a main manual transmission, a downstream group-shift transmission and a reversing transmission, also referred to as a reversing unit. Usually a main manual transmission with narrow stages is used, the gear stages of which are designed to be powershift-capable, and a group-shift transmission, the shifting groups of which are not powershift-capable, however. In such a transmission arrangement, a change of gears by the main manual transmission can be done by powershifting, i.e. without interruption of traction force, within a shifting group of the group-shift transmission. If it is necessary to change the shifting group of the group-shift transmission, however, this cannot be done without interrupting the traction force.

Such a transmission arrangement is presented by DE 10 2010 029597 A1, in which the main manual transmission is designed as a so-called parallel-shift transmission.

SUMMARY

In practice it is the case that in a group-shift transmission, for example, with three shifting groups A, B and C, a powershift capability between shifting groups B and C would clearly and sufficiently increase driving comfort and simultaneously satisfy the requirement for no interruption of traction force when shifting in this travel speed range. In this case, shifting group A provides a slow transmission ratio stage and shifting group C a fast transmission ratio stage.

The problem addressed by the present disclosure is that of providing a transmission arrangement that partially or completely meets the above-mentioned requirements.

The problem is solved by a transmission arrangement, particularly for an agricultural working vehicle, comprising a parallel-shift transmission and an input shaft, proceeding from which a drive power can be distributed via a first and a second shifting element to respective layshafts, a first and a second coaxially arranged output shaft, wherein the drive power can be transmitted by each of the layshafts to each of the output shafts as needed, and a group-shift transmission having multiple shifting groups, wherein a first shifting group can be drivingly connected to a first output shaft and a second shifting group can be drivingly connected to the second output shaft.

Due to the design according to the disclosure, a powershift capability of the shifting groups of the group-shift transmission is achieved in that one of the shifting groups can be driven via one of the output shafts and an additional shifting group can be driven by the other output shaft. Since the output shafts can in turn be drivingly connected to the layshafts and then shifted as needed and alternately by the two shifting elements into a force flow path, the shifting group that is associated with the output shaft currently not in the force flow path can be preselected, more particularly by bringing the shifting group into a driving connection with this output shaft.

A first shifting point is preferably provided with multiple shifting positions, wherein both output shafts are drivingly connected to one another in one of the shifting positions. In that way, all gear stages provided by the main manual transmission are usable for a part of the shifting groups. In the simplest configuration, the shifting point has only one additional shifting position, in which the two drive shafts are not coupled to one another.

The second shifting point is preferably provided with multiple shifting positions, wherein one of the shifting groups of the group-shift transmission is drivingly connected to one of the output shafts in one of the shifting positions. In this way a driving connection between the output shaft and the shifting group can be established as necessary.

The first and/or the second shifting point [is]/are preferably arranged in the group-shift transmission. This makes it possible to use a shifting element already present in the group-shift transmission and the controller for that element.

Preferably the first and the second shifting point are combined into a double shifting point having two shift positions, wherein the two output shafts are drivingly connected to one another in the first shifting position and, in the second shifting position, one of the shifting groups of the group-shift transmission is drivingly connected to one of the output shafts. Combining the two shifting points into one shifting point yields a reduced construction space requirement and simplified actuation of the shifting point.

A parallel-shift transmission preferably has first transmission ratios selectable via the first layshaft and second transmission ratios selectable via the second layshaft, wherein, respectively, a first transmission ratio along with a second transmission ratio is arranged in a shifting plane and at least one first shifting plane is output via the first output shaft and at least one second shifting plane is output via the second output shaft. An axially short overall shape can be achieved by means of the arrangement in shifting planes.

The first and second output shafts are preferably each connected to a respective first main shaft and a respective second main shaft of the group-shift transmission. A disconnect able interface, in the form of a pluggable longitudinal tooth connection for example, can be provided between the output shaft and the corresponding main shaft of the group-shift transmission. The first and second shifting points are preferably arranged on one of the two main shafts of the group-shift transmission.

BRIEF DESCRIPTION OF THE DRAWINGS

The transmission arrangement according to the disclosure will be described with reference to the following figures. Therein:

FIG. 4 shows a shifting matrix of the transmission arrangement in the first embodiment;

DETAILED DESCRIPTION

Figure 1:
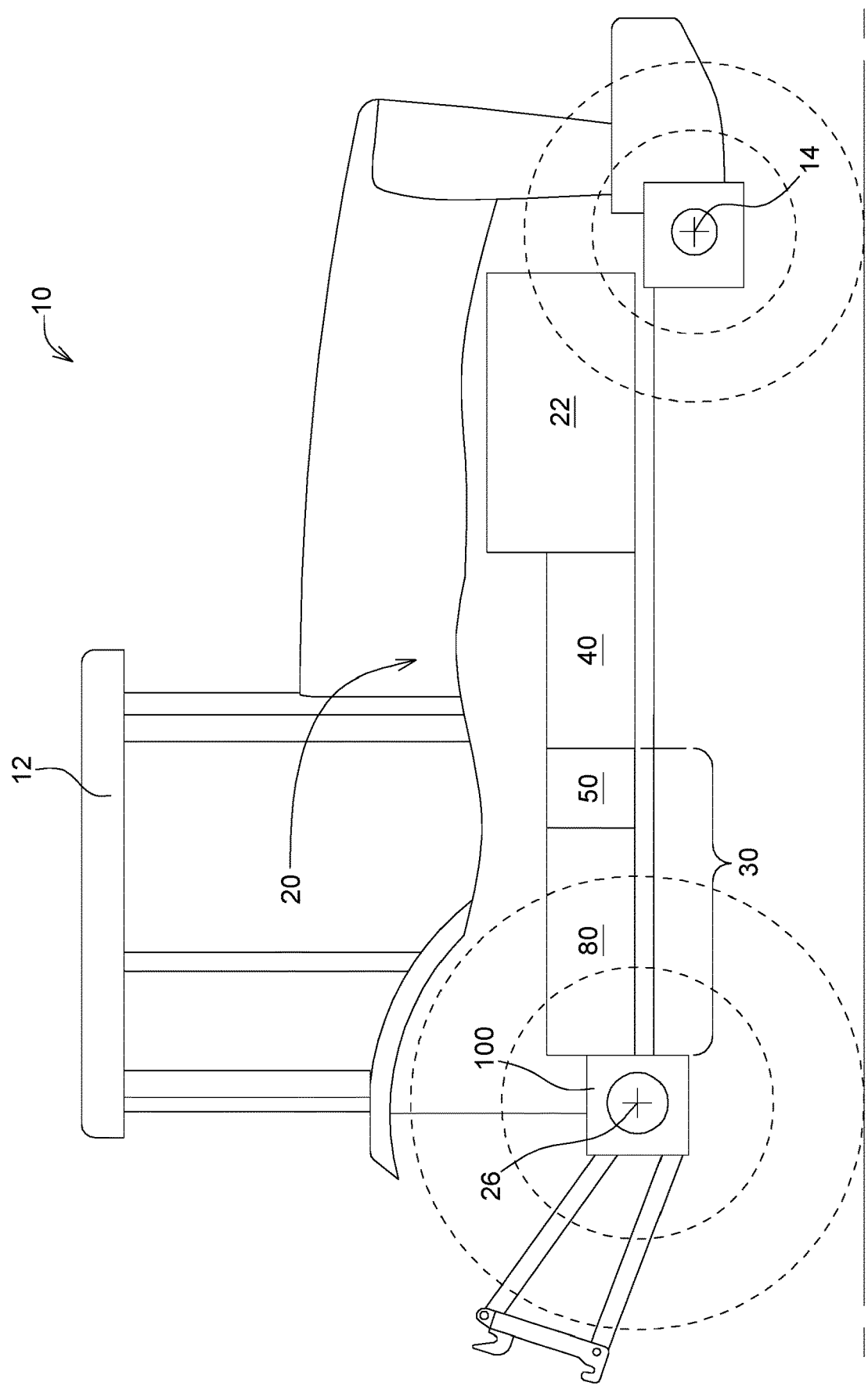
FIG. 1 shows an agricultural working vehicle having a drive train that comprises a transmission arrangement according to the disclosure.

FIG. 1 shows one possible embodiment of an agricultural working vehicle 10 in the form of a tractor having a drive train 20. The working vehicle 10 further comprises a cab 12, a front vehicle axle 14 and a rear vehicle axle 26. The front vehicle axle 14 and the rear vehicle axle 26 are part of the drive train 20, wherein the rear vehicle axle 26 generally is driven continuously and the front vehicle axle 14 can generally be activated if needed.

The drive train 20 further comprises a drive engine 22, which can be designed as an internal combustion engine, and a transmission structure, which can be composed of various individual transmission components as described below. In the transmission structure being currently described, a reversing transmission 40, a main manual transmission 50, a group-shift transmission 80 and a differential transmission 100 can be provided in the force and torque flow beginning from the drive engine 22. The unit consisting of the main manual transmission 50 and the group-shift transmission 80 is the transmission arrangement according to the disclosure, which is furnished with the reference number 30. The main shift transmission 50 is designed as a parallel-shift transmission. A representation of the output from the group-shift transmission 80 for the front wheel drive that can be activated if needed has been forgone.

Figure 2:
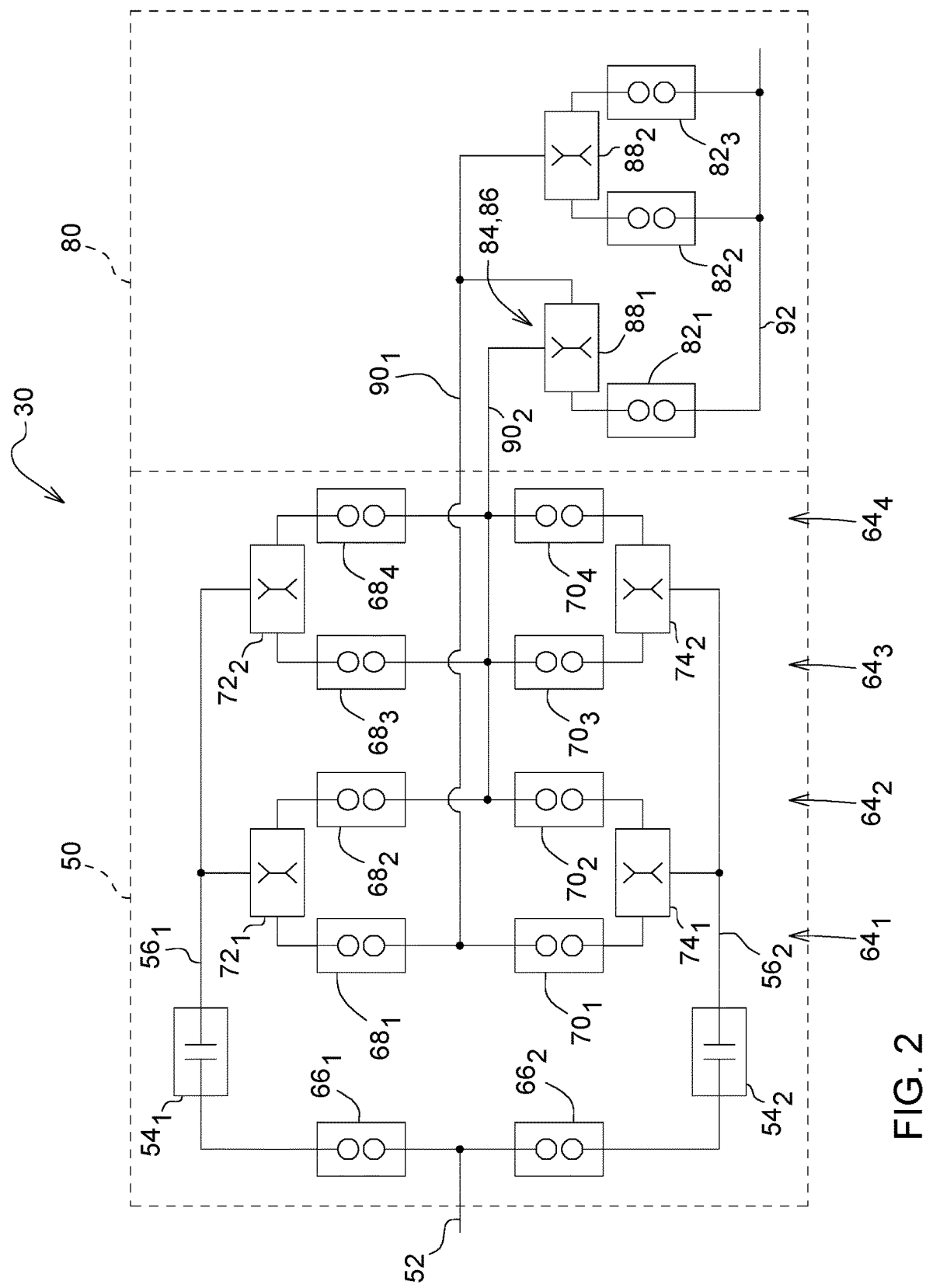
FIG. 2 shows a block shifting diagram of a transmission arrangement according to the disclosure in a first embodiment.

FIG. 2 shows a block shifting diagram of a transmission arrangement 30 according to the disclosure in a first embodiment. The transmission arrangement 30 comprises a main manual transmission in the form of a parallel-shift transmission 50, and a group-shift transmission 80 having three shifting groups $82_1$, $82_2$, $82_3$ in the present case. Both the parallel-shift transmission 50 and the group-shift transmission 80 can be constructed in a layshaft design, as shown in the present case.

The parallel-shift transmission 50 has an input shaft 52 driven by the drive engine 22 shown in FIG. 1, beginning from which the drive power can be distributed via two spur gear stages $66_1$, $66_2$ to respective shifting elements $54_1$, $54_2$, wherein the shifting elements $54_1$, $54_2$ can in turn bring layshafts $56_1$, $56_2$ into a driving connection to the spur gear stages $66_1$, $66_2$. Beginning from the layshafts $56_1$, $56_2$, the drive power can be transmitted via respective spur gear stages 68, 70 to an output of the parallel-shift transmission 50, wherein the output is formed by two output shafts $58_1$, $58_2$. In one possible specific configuration, the spur gear stages $68_1$-$68_4$ are associated with the layshaft $56_1$ and the spur gear stages $70_1$-$70_4$ are associated with the layshaft $56_2$. Respective idler gears of the spur gear stages $68_1$-$70_4$ can be retained on the layshafts $56_1$, $56_2$ and can be brought into a driving connection with the respective layshaft $56_1$, $56_2$ by means of double shifting points $72_1$, $72_2$, $74_1$, $74_2$. Opposing spur gear stages on the layshafts $56_1$, $56_2$ are arranged in shifting planes $64_1$-$64_4$. Thus the spur gear stages $68_1$, $70_1$ are arranged in the shifting plane $64_1$, the spur gear stages $68_2$, $70_2$ are arranged in the shifting plane $64_2$, the spur gear stages $68_3$, $70_3$ are arranged in the shifting plane $64_3$ and the spur gear stages $68_4$, $70_4$ are arranged in the shifting plane $64_4$. In the embodiment shown in FIG. 2, the first shifting plane $64_1$ is output via the first output shaft $58_1$ and the remaining shifting planes $64_2$, $64_3$, $64_4$ via the second output shaft $58_2$.

The group-shift transmission 80 has two main shafts $90_1$, $90_2$ driven by the output shafts $58_1$, $58_2$ of the parallel-shift transmission 50, from which main shafts the drive power can be transmitted via three shifting groups $82_1$, $82_2$, $82_3$ constructed as spur gear stages to an output shaft 92. Respective idler gears of the shifting groups $82_1$, $82_2$, $82_3$ can be retained on the main shafts $90_1$, $90_2$ and can be brought into a driving connection with the respective main shaft $90_1$, $90_2$ by means of double shifting points $88_1$, $88_2$. In the embodiment shown in FIG. 2, the shifting group $82_1$ is driven by the second main shaft $90_2$, and the shifting groups $82_2$, $82_3$ are driven by the first main shaft $90_1$. While the double shifting point $88_2$ is used to selectively connect one of the two shifting groups $82_2$, $82_3$ to the first main shaft $90_1$, the double shifting point $88_1$ is provided to drivingly connect the shifting group $82_1$ to the second main shaft $90_2$ in a first shifting position, or to drivingly connect both main shafts $90_1$, $90_2$ to one another. In an alternative configuration of this embodiment, the double shifting point $88_1$ can be implemented as two single shifting points 84, 86.

Figure 3:
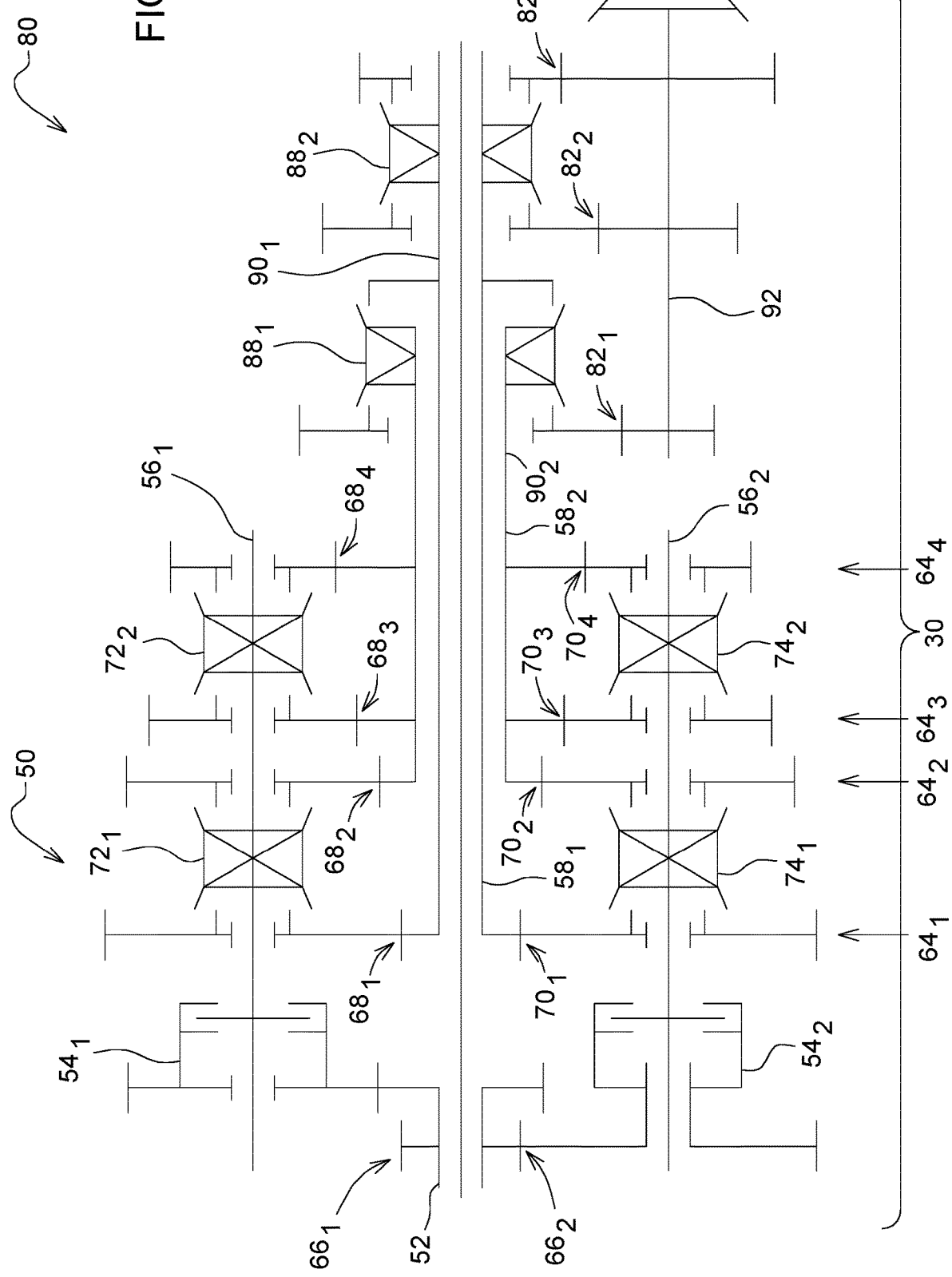
FIG. 3 shows a line diagram of the transmission arrangement in the first embodiment.

FIG. 3 shows a line diagram of the transmission arrangement 30 in the embodiment previously described. The odd-numbered gear stages 1, 3, 5 and 7 are retained on the layshaft $56_1$ of the parallel-shift transmission 50, wherein gear stage 7 is arranged in the first shifting plane $64_1$ and gear stage 1 in the fourth shifting plane $64_4$. The even-numbered gear stages 2, 4, 6 and 8 are retained on the layshaft $56_2$, wherein gear stage 8 is arranged in the first shifting plane $64_1$ and gear stage 2 in the fourth shifting plane $64_4$. The two output shafts $58_1$, $58_2$ are arranged coaxially to one another, wherein the first output shaft $58_1$ is retained inside the second output shaft $58_2$. The shifting groups $82_1$, $82_2$, $82_3$ are arranged in such a manner that the shifting group $82_3$ is that with the shortest transmission ratio, and the shifting group $82_1$ is that with the longest transmission ratio. The shifting groups $82_1$, $82_2$, $82_3$ can also be referred to, in the same order, as C, B and A.

Figure 4:
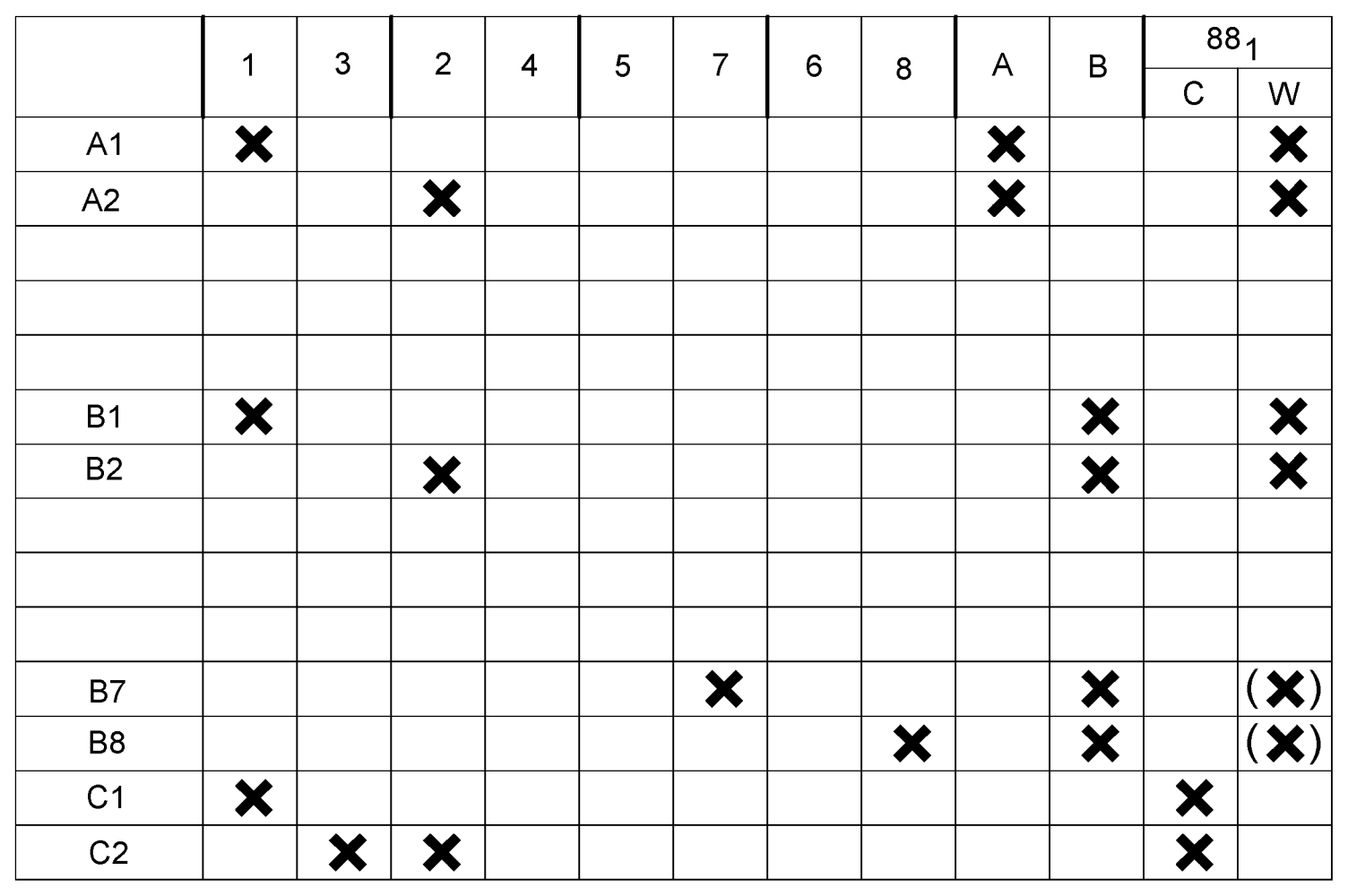

FIG. 4 shows a shifting matrix of the embodiment of the gear arrangement 30 described by means of FIGS. 2 and 3. The shifting matrix merely reproduces the most important shifting states. First the 8 gear stages of the parallel-shift transmission 50 are indicated in the columns of the shifting matrix. Then 3 shifting groups A, B, C of the group-shift transmission 80 are listed. Finally, the last column indicates the shifting state of the double shifting point $88_1$ in which the double shifting point $88_1$ drivingly connects the two main shafts $90_1$, $90_2$ to one another. As can be seen from the shifting matrix, the double shifting point $88_1$ is continuously in the shifting state in which the two main shafts $90_1$, $90_2$ are drivingly connected to one another, while gear stages 1-8 of the parallel-shift transmission 50 and the shifting groups A, B of the group-shift transmission 80 are passed through. Only transmission ratios B7 and B8 do not require the described shifting state of the double shifting point $88_1$. It can further be seen from the shifting matrix that the transmission ratios C1 and C2, i.e. combinations of the shifting group C and gear stages 1 and 2, can be achieved if the double shifting point $88_1$ is in the shifting state in which the idler gear of the shifting group $82_1$ is drivingly connected to the second main shaft $90_2$. Only the combinations of the shifting group C and the gear stages 7 and 8 cannot be selected in this embodiment of the transmission arrangement 30, in which the double shifting point $88_1$ is constructed as an integrated shifting point. The previously described alternative configuration with two individually and separately shiftable shifting points 84, 86 is able to do this, however.

Figure 5:
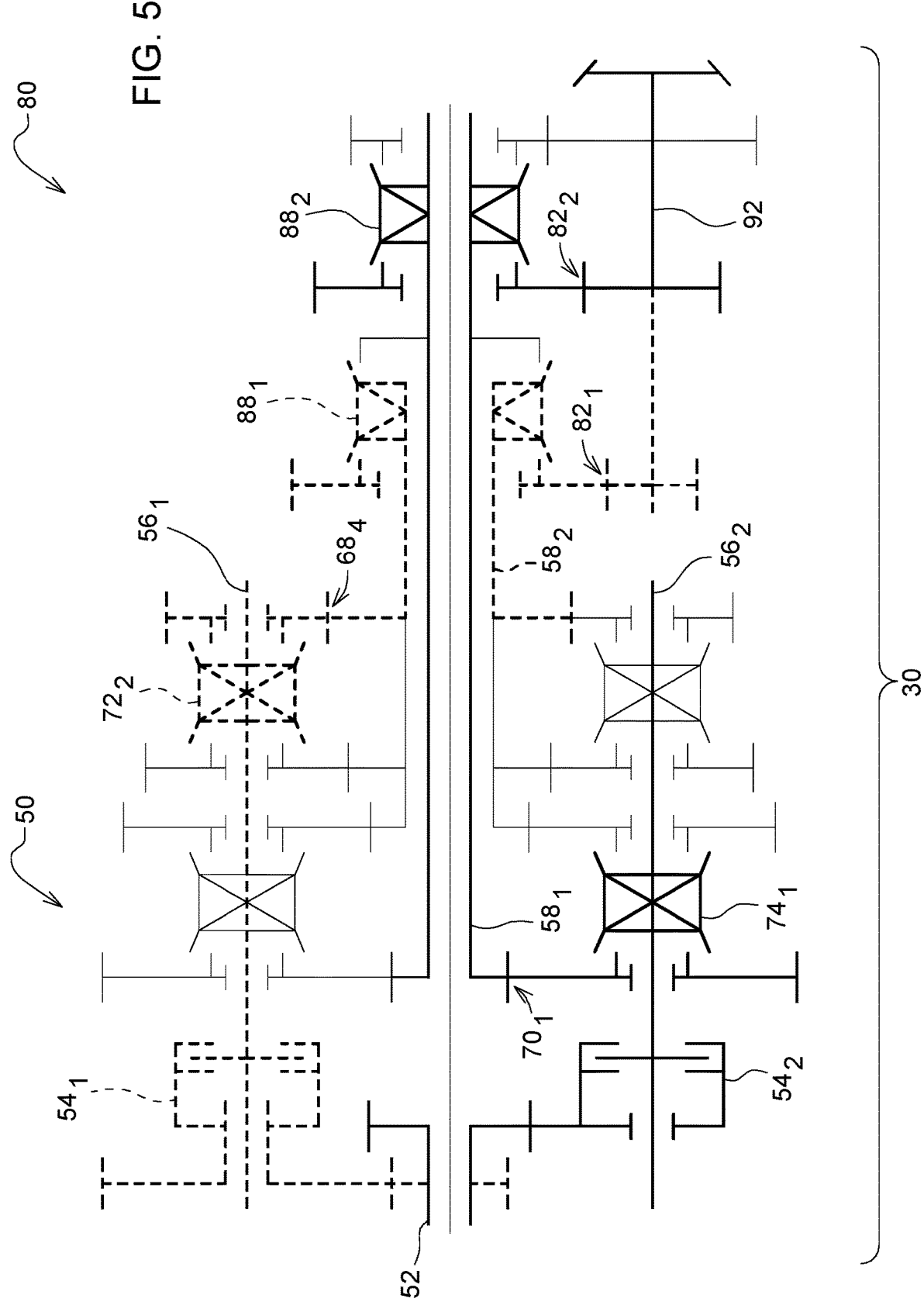
FIG. 5 shows a line diagram of the transmission arrangement in the first embodiment with force flows before and after a powershift.

A powershift from transmission ratio B8 into transmission ratio C1 will be described with reference to FIG. 5. The transmission arrangement 30 that is illustrated in FIG. 5 corresponds to that which was illustrated in FIG. 4, to the extent that only the relevant reference numbers are drawn in FIG. 5. The initially adjusted transmission ratio is B8, the force flow of which is illustrated in FIG. 5 with the thick solid line. The force flow runs from the input shaft 52 via the shifting element $54_2$ to the layshaft $56_2$. Via the spur gear stage $70_1$, which corresponds to gear stage 8 of the parallel-shift transmission 50, a driving force is applied via the appropriately positioned shifting point $74_1$ to the first output shaft $58_1$ and further into the group-shift transmission 80. There is in turn a flow of force via the shifting group $82_2$, or B, to the output shaft 92 via the appropriately positioned shifting point $88_2$. In addition, the transmission ratio C1, which has been preselected or is to be set, is shown with a thick dash line in FIG. 5. For this purpose, the shifting element $54_1$ is disengaged and, via the appropriately positioned shifting point $72_2$ and the spur gear stage $68_4$, which corresponds to stage 1 of the parallel shift transmission 50, the layshaft $56_1$ is drivingly connected to the second output shaft $58_2$, so that a driving connection to the group-shift transmission 80 exists.

There is a flow of force via the shifting group $82_1$, or C, to the output shaft 92 via the appropriately positioned shifting point $88_1$. The above-described line is thus coupled, starting from the output shaft 92, back to the disconnected shifting element $54_1$. Powershifting between the instantaneous transmission ratio B8 and the transmission ratio C1 that is to be set is accomplished by actuating the two shifting elements $54_1$ and $54_2$ at the same time and in opposite directions, in particular by disengaging the shifting element $54_2$ and engaging the shifting element $54_1$. In a variation of this, the transmission ratio B7 can be initially set. In this case, the force initially flows via the shifting element $54_1$ to the layshaft $56_1$, then further via the appropriately positioned shifting point $72_1$ and via the spur gear stage $68_1$, which corresponds to gear stage 7 of the parallel-shift transmission 50, likewise to the first output shaft $58_1$. There is then a powershift, by disengaging the shifting element $54_1$ and engaging the shifting element $54_2$. In a further variation of this, a powershift can also take place starting from the transmission ratios B7 or B8 to one of the transmission ratios C2-C6. For this purpose it is only necessary to select one of the spur gear stages $68_2$, $68_3$, $70_2$, $70_3$, $70_4$ on the respectively preselected layshaft $56_1$, $56_2$.

Figure 6:
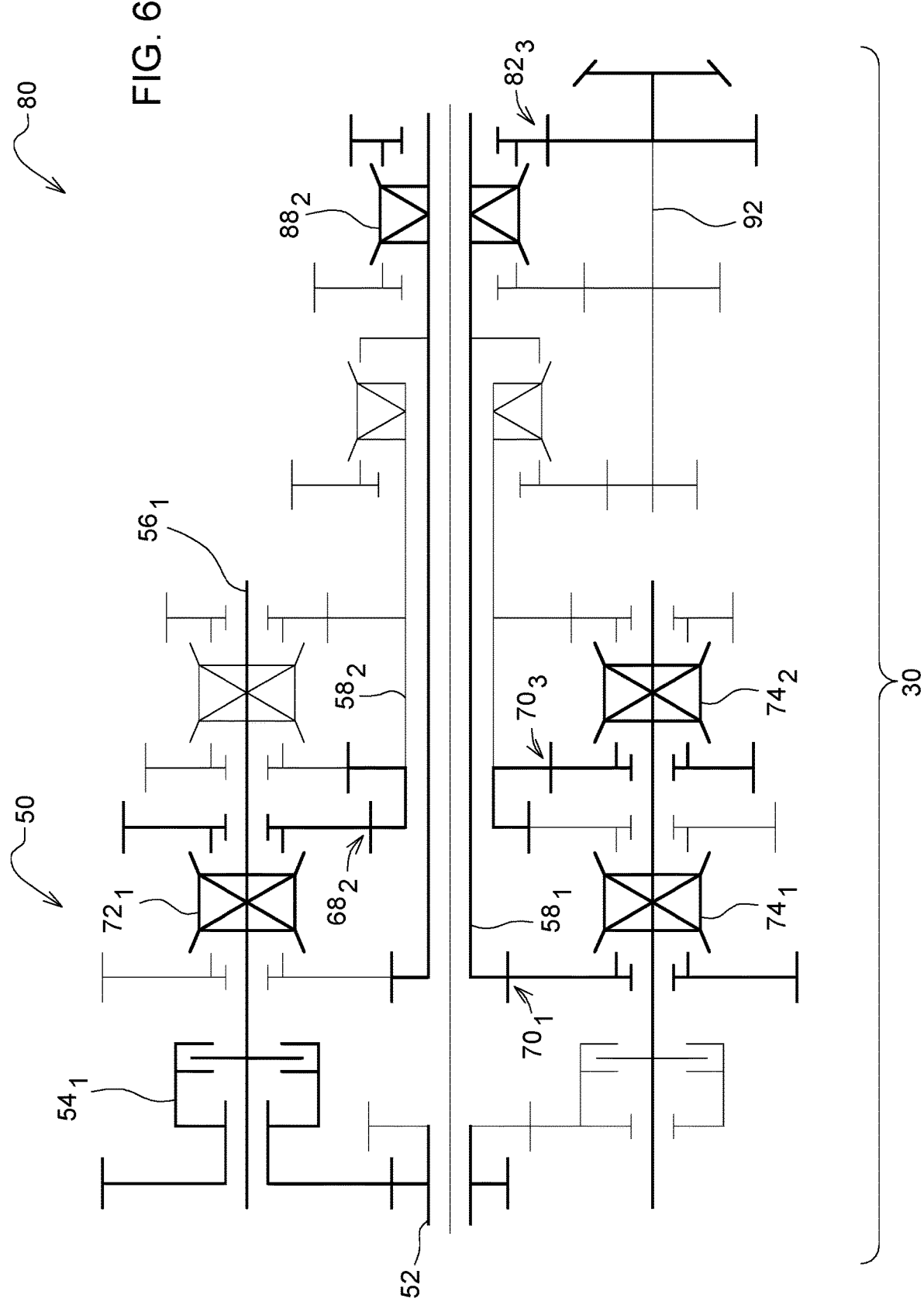
FIG. 6 shows a line diagram of the transmission arrangement in the first embodiment with additional shiftable transmission ratios.

FIG. 6 shows, again with a thick solid line, the transmission arrangement 30 with a set transmission ratio A9, which is accomplished by turning the force flow through the parallel-shift transmission 50. The force flow runs from the input shaft 52 via the shifting element $54_1$ to the layshaft $56_1$. Via the appropriately positioned shifting point $72_1$, the spur gear stage $70_3$, which drives the opposing layshaft $56_2$ via the appropriately positioned shifting point $74_2$, is driven via the spur gear stage $68_2$ and the output shaft $58_2$. Originating from the layshaft $56_2$, the flow of force runs via the appropriately positioned shifting point $74_1$ and via the spur gear stage $70_1$ to the output shaft $58_1$ and further into the group-shift transmission 80. Via the appropriately positioned shifting point $88_2$, there is a driving connection in the group-shift transmission to the output shaft 92 via the shifting group $82_3$, or A, whereby the transmission ratio A9 is set. As a variation of this, a transmission ratio B9 can be set by setting, via the appropriately positioned shifting point $88_2$, a driving connection to the output shaft 92 via the shifting group $82_2$, or B. In a further variation, the transmission ratios A10 and B10 can be set by directing the flow of force in the parallel-shift transmission 50 via the spur gear stage $70_4$, which can likewise be selected with the shifting point $74_2$, rather than via the spur gear stage $70_3$.

In summary, it can be stated with respect to the above-described embodiment of the transmission arrangement 30, including the variants, that the gear stages 1-6 of the parallel-shift transmission 50 are output by the main shaft of the group-shift transmission 80, which bears the shifting group C. Alternatively, both output shafts $58_1$, $58_2$, or the main shafts $90_1$, $90_2$, can be drivingly connected via the shifting point $88_1$, so that the gear stages 1-6 of the parallel-shift transmission 50 can be shifted with the shifting groups A and B of the group-shift transmission 80.

Figure 7:
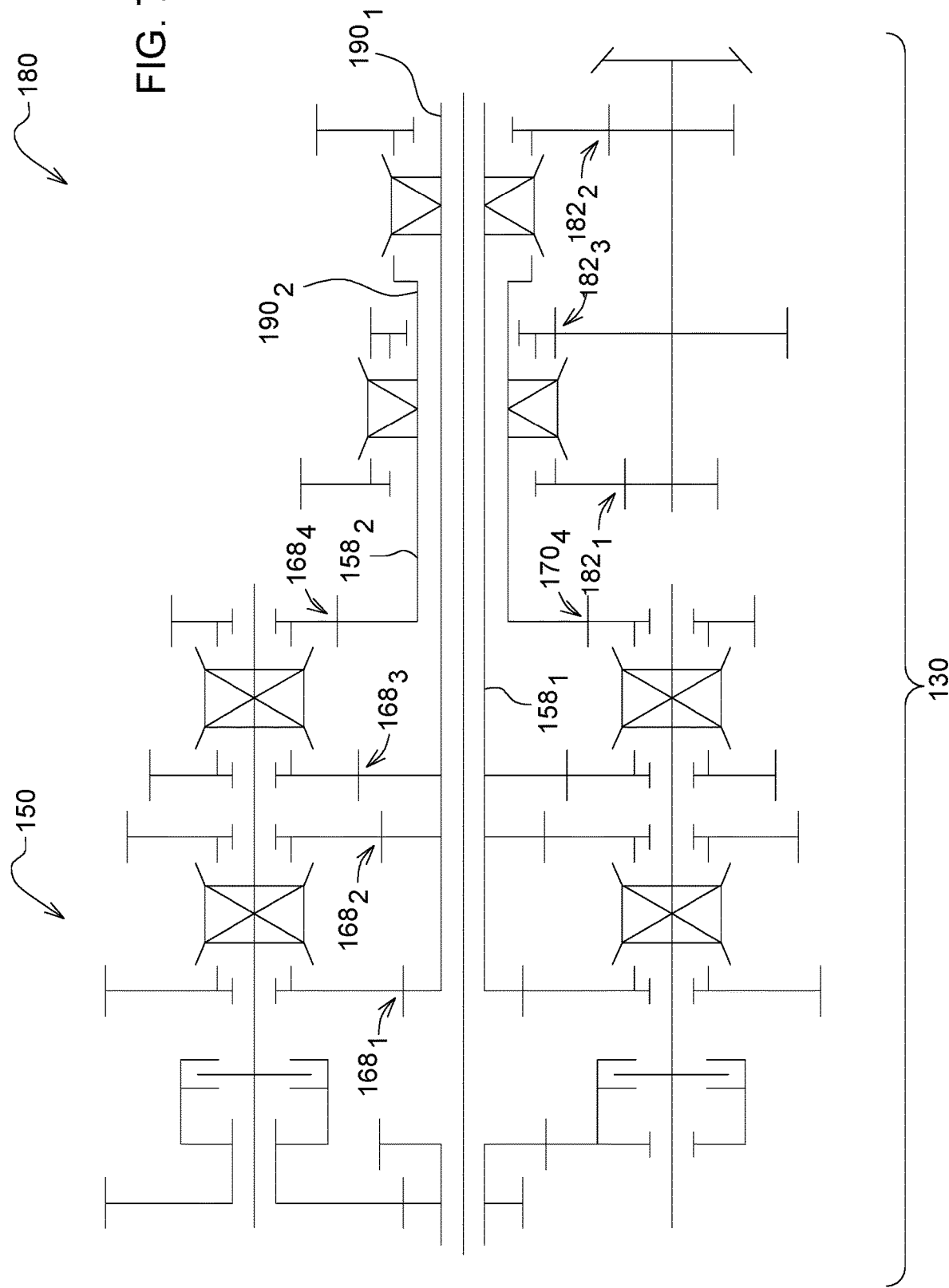
FIG. 7 shows a line diagram of the transmission arrangement in a second embodiment.

FIG. 7 shows a line diagram of the transmission arrangement 130 in a second embodiment. It is possible to forgo the illustration of this additional embodiment in a block shifting diagram. This embodiment will be provided with reference numbers incremented by 100 in relation to the previously described embodiment. In addition, only the differences from the above-described embodiment will be mentioned. It is recognizable that only the spur gear stages $168_4$ and $170_4$, i.e. gear stages 1 and 2, are output by the outer output shaft $158_2$ to the group-shift transmission 180. The other spur gear stages $168_1$-$168_3$ and $170_1$-$170_3$ are output via the inner output shaft $158_1$. The shifting groups $182_1$ and $182_3$, or A and C, of the second main shaft $190_2$ are arranged within the group-shift transmission. The shifting group $182_2$, or B, is associated with the first main shaft $190_1$.

Figure 8:
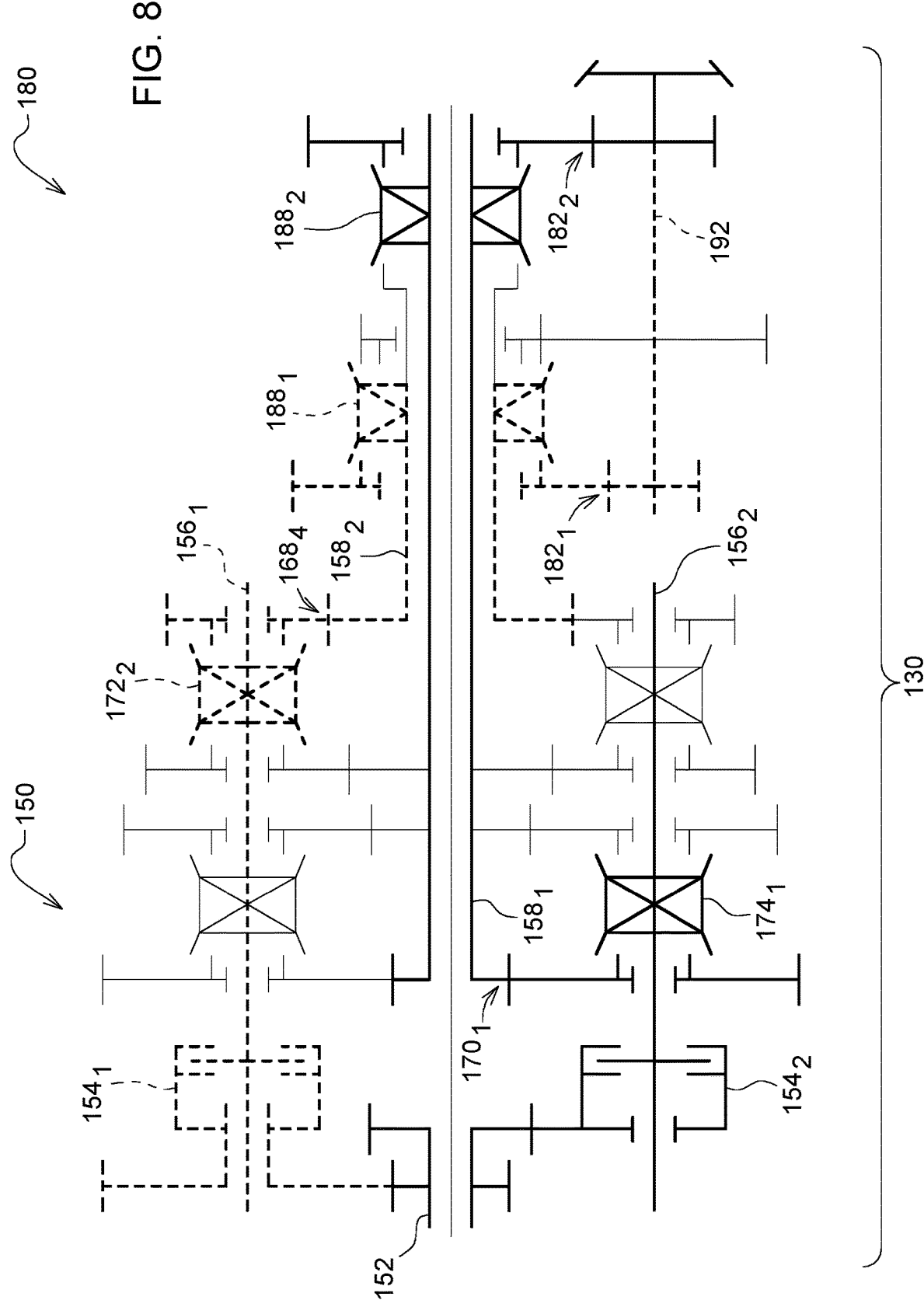
FIG. 8 shows a line diagram of the transmission arrangement in the second embodiment with force flows before and after a powershift.

FIG. 8 shows a power shift from transmission ratio B8 to transmission ratio C1 of the second embodiment of the transmission arrangement 130. Since the process of the powershifting and the elements involved correspond to that which was described in relation to FIG. 5, the reader is referred at this point to FIG. 5 to save time.

Figure 9:
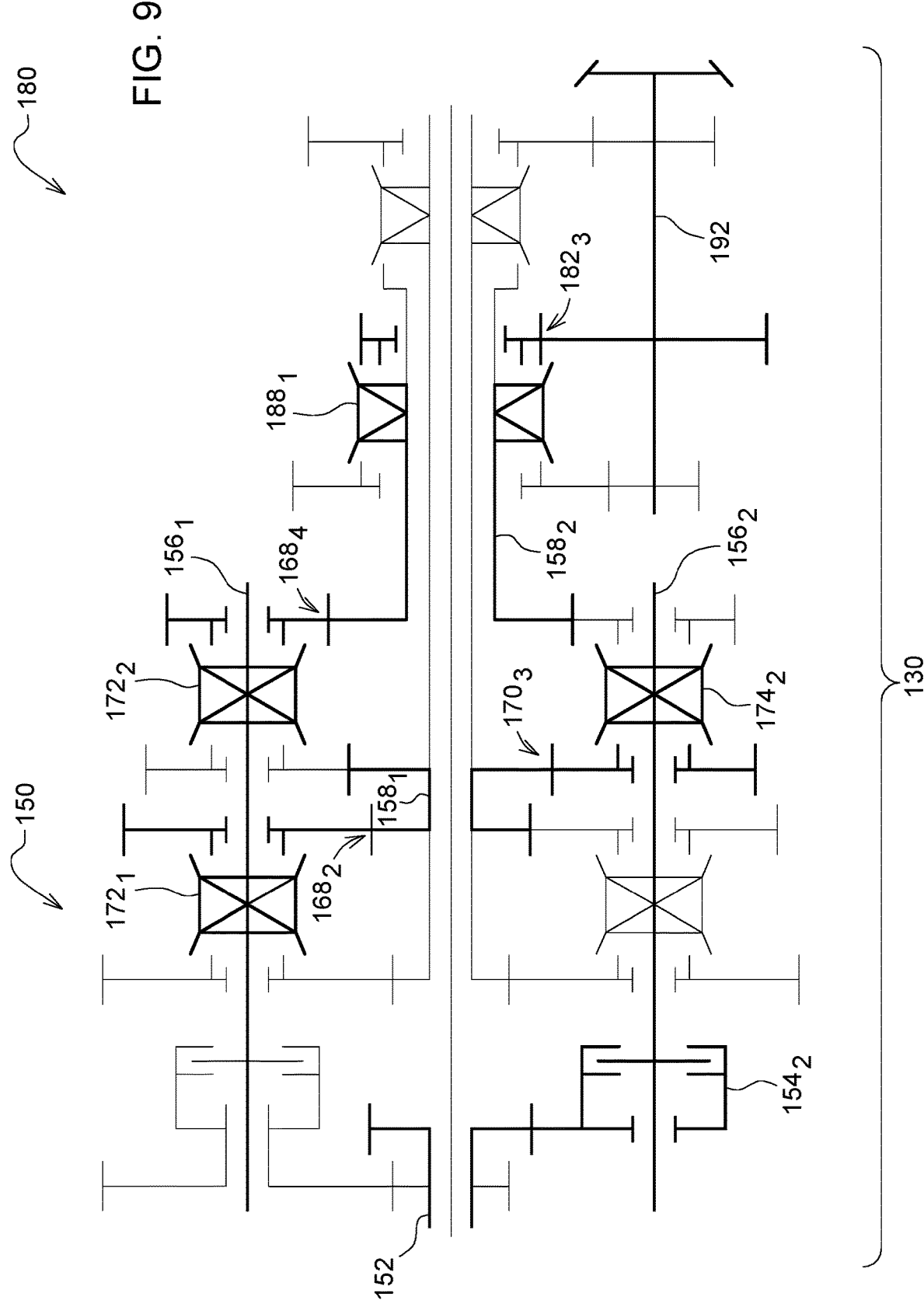
FIG. 9 shows a line diagram of the transmission arrangement in the second embodiment with additional selectable transmission ratios.

FIG. 9 shows, again with a thick solid line, the transmission arrangement 130 with a set transmission ratio A0, which is accomplished by turning the force flow through the parallel-shift transmission 150. The force flow runs from the input shaft 152 via the shifting element $154_2$ to the layshaft $156_2$. Via the appropriately positioned shifting point $174_2$, the spur gear stage $168_2$, which drives the opposing layshaft $156_1$ via the appropriately positioned shifting point $172_1$, is driven via the spur gear stage $170_3$ and the output shaft $158_1$. Originating from the layshaft $156_1$, the flow of force runs via the appropriately positioned shifting point $172_2$ and via the spur gear stage $168_4$ to the output shaft $158_2$ and further into the group-shift transmission 180. Via the appropriately positioned shifting point $188_1$, there is a driving connection in the group-shift transmission to the output shaft 192 via the shifting group $182_3$, or A, whereby the transmission ratio A0 is set. The transmission ratio A0 is approximately 20% shorter than the transmission ratio A1 and there can be a power shift to transmission ratio A1 from transmission ratio A0. As a variation of this, the transmission ratio A0 can be set by directing the flow of force in the parallel-shift transmission 150, instead of via the spur gear stage $168_2$, via the spur gear stage $168_1$, which can also be selected with the shifting point $172_1$. The transmission ratio A00 is approximately 70% shorter than the transmission ratio A1 and there can be a power shift to transmission ratio A1 from transmission ratio A00.

LIST OF REFERENCE NUMBERS

10 Working vehicle
12 Cab
14 Front vehicle axle
20 Drive train
22 Drive engine
26 Rear vehicle axle
30 Transmission arrangement
40 Reversing gear
50 Parallel-shift transmission
52 Input shaft
54 Shifting element
56 Layshaft
58 Output shaft
60 Transmission ratio
62 Transmission ratio
64 Shifting plane
66 Spur gear stage
68 Spur gear stage
70 Spur gear stage
72 Shifting point
74 Shifting point
80 Group-shift transmission
82 Shifting groups
84 Shifting point
86 Shifting point
88 Double shifting position
90 Main shaft
92 Output shaft
100 Differential transmission

The invention claimed is:

1. A transmission arrangement for an agricultural working vehicle, comprising:
a parallel-shift transmission having an input shaft, from which a drive power is distributed via a first shifting element and a second shifting element to a respective first layshaft and a second layshaft, and having a first output shaft and a second output shaft arranged coaxially with one another, wherein the drive power can be transmitted from each of the layshafts to each of the output shafts as necessary;
a first shifting point having a first position which connects the first layshaft to the first output shaft and a second position which connects the first layshaft to the second output shaft, and a second shifting point having a first position which connects the second layshaft to the first output shaft and a second position which connects the second layshaft to the second output shaft;
a group-shift transmission having multiple shifting groups axially spaced from the first layshaft and the second layshaft, wherein a first shifting group is drivingly connected to the first output shaft and a second shifting group is drivingly connected to the second output shaft, the multiple shifting groups transmitting drive power to a final output shaft; and
a third shifting point having a first position which connects the first output shaft to the final output shaft via the first shifting group and a second position which connects the first output shaft to the second output shaft, and a fourth shifting point having a first position which connects the second output shaft to the final output shaft via the second shifting group.

2. The transmission arrangement of claim 1, wherein the third shifting point and the fourth shifting point are arranged in the group-shift transmission.

3. The transmission arrangement of claim 1, wherein the parallel-shift transmission has first transmission ratios shiftable via the first layshaft and second transmission ratios shiftable via the second layshaft, wherein a first transmission ratio is arranged with a respective second transmission ratio in a respective shifting plane and at least one first shifting plane is output via the first output shaft and at least one second shifting plane is output via the second output shaft.

4. The transmission arrangement of claim 1, wherein the first output shaft and the second output shaft are drivingly connected to a respective first main shaft and a second main shaft of the group-shift transmission.

5. The transmission arrangement of claim 4, wherein the third shifting point and the fourth shifting points are arranged on one of the first main shaft and the second main shaft of the group-shift transmission.

6. A transmission arrangement comprising:
a parallel-shift transmission having an input shaft, a first output shaft, a second output shaft, a first layshaft, and a second layshaft, wherein the input shaft distributes drive power via a first shifting element and a second shifting element to the first layshaft and the second layshaft, respectively, wherein the first output shaft and the second output shaft are arranged coaxially with one another, and wherein each of the first layshaft and the second layshaft is selectably transmit the drive power;
a first shifting point having a first position which connects the first layshaft to the first output shaft and a second position which connects the first layshaft to the second output shaft, and a second shifting point having a first position which connects the second layshaft to the first output shaft and a second position which connects the second layshaft to the second output shaft;
a group-shift transmission spaced from the first layshaft and the second layshaft and having a first main shaft drivingly connected to the first output shaft and a second main shaft drivingly connected to the second output shaft, a first shifting group drivingly connected to the first main shaft and a second shifting group drivingly connected to the second main shaft, the first and second shifting groups transmitting drive power to a final output shaft; and a third shifting point having a first position which connects the first main shaft to the final output shaft via the first shifting group and a second position which connects the first main shaft to the second main shaft, and a fourth shifting point having a first position which connects the second main shaft to the final output shaft via the second shifting group.

7. The transmission arrangement of claim 6, wherein at least one of the third shifting point and the fourth shifting point is arranged in the group-shift transmission.

8. The transmission arrangement of claim 7, wherein the parallel-shift transmission includes first transmission ratios shiftable via the first layshaft and second transmission ratios shiftable via the second layshaft, wherein a first transmission ratio of the first transmission ratios is arranged with a respective second transmission ratio of the second transmission ratios in a respective shifting plane, and at least one first shifting plane is output via the first output shaft and at least one second shifting plane is output via the second output shaft.

9. A transmission arrangement comprising:

a parallel-shift transmission having an input shaft, a first output shaft, a second output shaft, a first layshaft, and a second layshaft, wherein the input shaft is configured to distribute drive power via a first shifting element and a second shifting element to the first layshaft and the second layshaft, respectively, wherein the first output shaft and the second output shaft are arranged coaxially with one another, and wherein each of the first layshaft and the second layshaft is configured to selectably transmit the drive power;

a first shifting point having a first position which connects the first layshaft to the first output shaft and a second position which connects the first layshaft to the second output shaft, and a second shifting point having a first position which connects the second layshaft to the first output shaft and a second position which connects the second layshaft to the second output shaft;

a group-shift transmission spaced from the first layshaft and the second layshaft of the parallel-shift transmission and having a first main shaft configured to be drivingly connected to the first output shaft, a second main shaft configured to be drivingly connected to the second output shaft, a first shifting group configured to be drivingly connected to the first main shaft, and a second shifting group configured to be drivingly connected to the second main shaft, the first and second shifting groups configured to transmit drive power to a final output shaft; and a third shifting point having a first position which connects the first main shaft to the final output shaft via the first shifting group and a second position which connects the first main shaft to the second main shaft, and a fourth shifting point having a first position which connects the second main shaft to the final output shaft via the second shifting group.

\* \* \* \* \*